(12) United States Patent
Yang et al.

(10) Patent No.: US 11,316,923 B2
(45) Date of Patent: Apr. 26, 2022

(54) UNSTRUCTURED DATA STORAGE FUNCTION (UDSF) SERVICES

(71) Applicant: Telefonaktiebolaget LM Ericsson (publ), Stockholm (SE)

(72) Inventors: Yong Yang, Kållered (SE); Maria Cruz Bartolomé Rodrigo, Madrid (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 71 days.

(21) Appl. No.: 16/632,237

(22) PCT Filed: Jul. 21, 2017

(86) PCT No.: PCT/EP2017/068464
§ 371 (c)(1),
(2) Date: Jan. 17, 2020

(87) PCT Pub. No.: WO2019/015778
PCT Pub. Date: Jan. 24, 2019

(65) Prior Publication Data
US 2020/0177677 A1  Jun. 4, 2020

(51) Int. Cl.
*G06F 15/16* (2006.01)
*H04L 67/1097* (2022.01)
(Continued)

(52) U.S. Cl.
CPC .......... *H04L 67/1097* (2013.01); *H04L 67/16* (2013.01); *H04L 67/2814* (2013.01)

(58) Field of Classification Search
CPC .. H04L 67/1097; H04L 67/16; H04L 67/2814
(Continued)

(56) References Cited

U.S. PATENT DOCUMENTS

2014/0334418 A1* 11/2014 Urie ................. H04W 4/70
370/329
2016/0269908 A1*  9/2016 Richards ............... H04L 63/083
(Continued)

OTHER PUBLICATIONS

Author Unknown, "Technical Specification Group Core Network and Terminals; 5G System—Phase 1; CT WG4 Aspects (Release 15)," Technical Report 29.891, Version 0.3.0, 3GPP Organizational Partners, May 2017, 80 pages.
(Continued)

*Primary Examiner* — Thu Ha T Nguyen
(74) *Attorney, Agent, or Firm* — Withrow & Terranova, PLLC

(57) ABSTRACT

Methods and systems for Unstructured Data Storage Function (UDSF) services in a telecommunications network, such as a Fifth Generation (5G) Core network are provided. According to one aspect of the present disclosure, a method for UDSF services in a telecommunications network comprises, at a UDSF node for providing UDSF services and having circuitry: receiving, from a first network node, a first request to perform a data operation involving first data associated with an identified User Equipment (UE) and an identified Network Function (NF); and sending, to the first network node, a response to the first request, the response comprising a locking status of the first data and/or redirect information.

20 Claims, 8 Drawing Sheets

(51) Int. Cl.
*H04L 67/51* (2022.01)
*H04L 67/563* (2022.01)

(58) Field of Classification Search
USPC .............................. 709/216, 217, 218, 219
See application file for complete search history.

(56) References Cited

U.S. PATENT DOCUMENTS

| | | | | |
|---|---|---|---|---|
| 2016/0294493 | A2* | 10/2016 | Daoura | H04W 12/033 |
| 2016/0359986 | A1* | 12/2016 | Jones | H04L 67/2814 |
| 2016/0360360 | A1* | 12/2016 | Jones | G08G 5/0069 |
| 2017/0265076 | A1* | 9/2017 | Richards | H04W 12/128 |
| 2017/0303082 | A1* | 10/2017 | Jones | H04L 9/088 |
| 2019/0149434 | A1* | 5/2019 | Chou | H04L 41/082 |
| | | | | 370/254 |
| 2019/0158408 | A1* | 5/2019 | Li | H04L 45/306 |
| 2019/0182718 | A1* | 6/2019 | Shan | H04W 60/04 |
| 2019/0199802 | A1* | 6/2019 | Zhu | H04W 68/005 |
| 2019/0261435 | A1* | 8/2019 | Chandramouli | H04W 8/04 |
| 2019/0283239 | A1* | 9/2019 | Skaaksrud | B25J 9/163 |
| 2019/0373441 | A1* | 12/2019 | Ryu | H04W 48/18 |
| 2020/0015158 | A1* | 1/2020 | So | H04W 48/18 |
| 2020/0037386 | A1* | 1/2020 | Park | H04W 76/25 |
| 2020/0045565 | A1* | 2/2020 | Tanna | H04W 52/40 |
| 2020/0120570 | A1* | 4/2020 | Youn | H04W 36/0033 |
| 2020/0137675 | A1* | 4/2020 | Park | H04W 80/10 |
| 2020/0196110 | A1* | 6/2020 | Jakobsson | H04B 1/7143 |
| 2020/0228880 | A1* | 7/2020 | Iyer | H04N 21/23424 |
| 2020/0229069 | A1* | 7/2020 | Chun | H04W 36/0079 |
| 2020/0245229 | A1* | 7/2020 | Horn | H04W 48/10 |
| 2020/0267554 | A1* | 8/2020 | Faccin | H04L 63/101 |
| 2020/0267634 | A1* | 8/2020 | Kim | H04W 8/08 |
| 2020/0275266 | A1* | 8/2020 | Jakobsson | H04W 4/38 |
| 2020/0322884 | A1* | 10/2020 | Di Girolamo | H04W 4/70 |
| 2020/0344084 | A1* | 10/2020 | Shribman | H04L 61/1511 |
| 2020/0356618 | A1* | 11/2020 | Shribman | H04L 67/146 |
| 2020/0394332 | A1* | 12/2020 | Jakobsson | H04W 4/02 |
| 2020/0404069 | A1* | 12/2020 | Li | H04L 67/289 |
| 2020/0404739 | A1* | 12/2020 | Thiebaut | H04L 12/185 |
| 2020/0413241 | A1* | 12/2020 | Park | H04W 76/18 |
| 2021/0105308 | A1* | 4/2021 | Bouazizi | H04L 65/80 |
| 2021/0117249 | A1* | 4/2021 | Doshi | H04L 67/1014 |
| 2021/0144511 | A1* | 5/2021 | Jones | H04W 68/00 |
| 2021/0176817 | A1* | 6/2021 | Takakura | H04W 48/18 |
| 2021/0182111 | A1* | 6/2021 | Jakobsson | G06F 9/52 |
| 2021/0211960 | A1* | 7/2021 | Ryu | H04W 36/14 |
| 2021/0263779 | A1* | 8/2021 | Haghighat | G06F 11/3419 |
| 2021/0267001 | A1* | 8/2021 | Takakura | H04M 11/04 |

OTHER PUBLICATIONS

Author Unknown, "Technical Specification Group Services and System Aspects; System Architecture for the 5G System; Stage 2 (Release 15)," Technical Specification 23.501, Version 0.5.0, 3GPP Organizational Partners, May 2017, 145 pages.

Author Unknown, "Technical Specification Group Services and System Aspects; System Architecture for the 5G System; Stage 2 (Release 15)," Technical Specification 23.501, Version 1.0.0, 3GPP Organizational Partners, Jun. 2017, 146 pages.

Author Unknown, "Technical Specification Group Services and System Aspects; Procedures for the 5G System; Stage 2 (Release 15)," Technical Specification 23.502, Version 0.4.0, 3GPP Organizational Partners, May 2017, 126 pages.

Author Unknown, "Technical Specification Group Services and System Aspects; Procedures for the 5G System; Stage 2 (Release 15)," Technical Specification 23.502, Version 0.5.0, 3GPP Organizational Partners, Jul. 2017, 148 pages.

SA WG2, "TD SP-170384: Presentation of TR 23.501: System Architecture for the 5G System (Release 15) to TSG SA for Approval Information," Third Generation Partnership Project (3GPP), TSG SA Meeting #76, Jun. 7-9, 2017, 2 pages, West Palm Beach, USA.

International Search Report and Written Opinion for International Patent Application No. PCT/EP2017/068464, dated Feb. 13, 2018, 14 pages.

Written Opinion for International Patent Application No. PCT/EP2017/068464, dated Jun. 17, 2019, 7 pages.

International Preliminary Report on Patentability for International Patent Application No. PCT/EP2017/068464, dated Oct. 10, 2019, 19 pages.

* cited by examiner

UNSTRUCTURED DATA STORAGE FUNCTION (UDSF) SERVICES

This application is a 35 U.S.C. § 371 national phase filing of International Application No. PCT/EP2017/068464, filed Jul. 21, 2017, the disclosure of which is incorporated herein by reference in its entirety.

TECHNICAL FIELD

The present disclosure relates to a core network of a Fifth Generation (5G) New Radio (NR) system, and more particularly to methods and systems for Unstructured Data Storage Function (UDSF) services in a telecommunications network.

BACKGROUND

The Third Generation Partnership Project (3GPP) Technical Specification (TS) 23.501, Section 4.2.5-1, has specified a new Network Function (NF) called the Unstructured Data Storage Function (UDSF). The UDSF is an optional function that allows storage and retrieval, by any NF, of information as unstructured data. The UDSF belongs to the same Public Land Mobile Network (PLMN) where the NF is located. Control Plane (CP) NFs may share a UDSF for storing their respective unstructured data or may each have their own UDSF, e.g. a UDSF may be located close to the respective NF. Deployments can choose to co-locate UDSF with other NFs, such as a Structured Data Storage Function (SDSF).

The main motivation to introduce the UDSF is to enable full stateless Fifth Generation (5G) Core Network (5GC) functions, such as the Session Management Function (SMF), for example, to facilitate NF implementation in a Cloud Native Architecture, which enables dynamic instantiation of NF instance based on incoming load. This makes scale-up and scale-down easier. In addition, it makes the network more robust in case of any NF failure, e.g., a replacement NF may be implemented very quickly.

Creating a shared data storage function is one step further for such stateless operations, i.e. each individual 5GC function is kept as stateless, with the required User Equipment (UE) context being stored in a shared Data storage and fetched by the NF when some services are invoked for the given UE.

So far, however, no UDSF service has been defined, nor is there any definition of how a UDSF service should be used to enable such stateless operations.

SUMMARY

The subject matter of the present disclosure provides methods and systems for Unstructured Data Storage Function (UDSF) services in a telecommunications network, such as a Fifth Generation (5G) Core network.

According to one aspect of the present disclosure, a method for UDSF services in a telecommunications network comprises, at a UDSF node for providing UDSF services and having circuitry: receiving, from a first network node, a first request to perform a data operation involving first data associated with an identified User Equipment (UE) and an identified Network Function (NF); and sending, to the first network node, a response to the first request, the response comprising a locking status of the first data and/or redirect information.

In one embodiment, the method further comprises performing the data operation on the first data according to the first request.

In one embodiment, performing the data operation comprises creating the first data, reading the first data, updating the first data, and/or deleting the first data.

In one embodiment, the first request comprises a vendor identifier and wherein performing the data operation comprises performing the data operation on the first data that is in a format supported by an identified vendor.

In one embodiment, performing the data operation comprises determining that the first data is not in the format supported by the identified vendor and wherein sending the response to the first request comprises sending a response indicating that the first data is not in the format supported by the identified vendor.

In one embodiment, performing the data operation comprises determining that the first data is in a format supported by a second vendor and wherein sending the response to the first request comprises sending a response comprising an identity of the second vendor.

In one embodiment, the response to the first request comprises at least some of the first data.

In one embodiment, the response to the first request comprises a locking status that indicates that the first data is not locked.

In one embodiment, the method further comprises receiving, from the first network node, a request to lock the first data, the request to lock the first data comprising first redirect information; setting the first data to a locked status; storing the first redirect information; and sending, to the first network node, a confirmation that the first data is locked.

In one embodiment, the method further comprises receiving, from the first network node, a request to unlock the first data and delete the redirect information; setting the first data to an unlocked status; deleting the first redirect information; and sending, to the first network node, a confirmation that the first data is unlocked and that the redirect information is deleted.

In one embodiment, the response to the first request comprises a locking status that indicates that the first data is locked.

In one embodiment, the response to the first request comprises redirect information that identifies a network node for which the data has been locked.

In one embodiment, the redirect information comprises an Internet Protocol (IP) or Uniform Resource Locator (URL) address of the network node for which the data has been locked.

In one embodiment, the method further comprises receiving, from a second network node, a second request to perform a data operation involving the first data; determining a locking status of the first data; and, upon a determination that the first data is locked, sending, to the second network node, a response to the second request, the response comprising a locking status that indicates that the first data is locked and/or the first redirect information.

In one embodiment, the response to the second request further comprises at least some of the first data.

According to one aspect of the present disclosure, a network node for providing an UDSF in a telecommunications network comprises: one or more processors; and memory storing instructions executable by the one or more processors, whereby the node is operable to: receive, from a first network node, a first request to perform a data operation involving first data associated with an identified (UE) and an identified NF; and send, to the first network node, a response to the first request, the response comprising a locking status of the first data and/or redirect information.

In one embodiment, the network node is further operable to perform the data operation on the first data according to the first request.

In one embodiment, performing the data operation comprises creating the first data, reading the first data, updating the first data, and/or deleting the first data.

In one embodiment, the first request comprises a vendor identifier and wherein performing the data operation comprises performing the data operation on the first data that is in a format supported by an identified vendor.

In one embodiment, performing the data operation comprises determining that the first data is not in the format supported by the identified vendor and wherein sending the response to the first request comprises sending a response indicating that the first data is not in the format supported by the identified vendor.

In one embodiment, performing the data operation comprises determining that the first data is in a format supported by a second vendor and wherein sending the response to the first request comprises sending a response comprising an identity of the second vendor.

In one embodiment, the response to the first request comprises at least some of the first data.

In one embodiment, the response to the first request comprises a locking status that indicates that the first data is not locked.

In one embodiment, the network node is further operable to: receive, from the first network node, a request to lock the first data, the request to lock the first data comprising first redirect information; set the first data to a locked status; store the first redirect information; and send, to the first network node, a confirmation that the first data is locked.

In one embodiment, the network node is further operable to: receive, from the first network node, a request to unlock the first data and delete the redirect information; set the first data to an unlocked status; delete the first redirect information; and send, to the first network node, a confirmation that the first data is unlocked and that the redirect information is deleted.

In one embodiment, the response to the first request comprises a locking status that indicates that the first data is locked.

In one embodiment, the response to the first request comprises redirect information that identifies a network node for which the data has been locked.

In one embodiment, the redirect information comprises an IP or URL address of the network node for which the data has been locked.

In one embodiment, the network node is further operable to: receive, from a second network node, a second request to perform a data operation involving the first data; determine a locking status of the first data; and, upon a determination that the first data is locked, send, to the second network node, a response to the second request, the response comprising a locking status that indicates that the first data is locked and/or the first redirect information.

In one embodiment, the response to the second request further comprises at least some of the first data.

According to another aspect of the present disclosure, a network node for providing an UDSF in a telecommunications network is adapted to: receive, from a first network node, a first request to perform a data operation involving first data associated with an identified UE and an identified NF; and send, to the first network node, a response to the first request, the response comprising a locking status of the first data and/or redirect information.

According to another aspect of the present disclosure, a network node for providing an UDSF in a telecommunications network comprises: means for receiving, from a first network node, a first request to perform a data operation involving first data associated with an identified UE and an identified NF; and means for sending, to the first network node, a response to the first request, the response comprising a locking status of the first data and/or redirect information.

According to another aspect of the present disclosure, a network node for providing an UDSF in a telecommunications network comprises: a receiving module operable to receive, from a first network node, a first request to perform a data operation involving first data associated with an identified UE and an identified NF; and a sending module operable to send, to the first network node, a response to the first request, the response comprising a locking status of the first data and/or redirect information.

According to another aspect of the present disclosure, a non-transitory computer readable medium stores software instructions that when executed by one or more processors of a network node for providing an UDSF in a telecommunications network cause the network node to: receive, from a first network node, a first request to perform a data operation involving first data associated with an identified UE and an identified NF; and send, to the first network node, a response to the first request, the response comprising a locking status of the first data and/or redirect information.

According to another aspect of the present disclosure, a computer program comprises instructions which, when executed by at least one processor, cause the at least one processor to carry out any of the methods disclosed herein.

According to another aspect of the present disclosure, a carrier comprises the computer program described above, wherein the carrier is one of an electronic signal, an optical signal, a radio signal, or a computer readable storage medium.

According to another aspect of the present disclosure, a method for UDSF services in a telecommunications network comprises: at a NF node having circuitry: sending, to a UDSF service node for providing UDSF services, a first request to perform a data operation involving first data associated with an identified UE and an identified NF; and receiving, from the UDSF service node, a response to the first request, the response comprising a locking status of the first data and/or redirect information.

In one embodiment, the first request to perform the data operation comprises a request to create the first data, read the first data, update the first data, and/or delete the first data.

In one embodiment, the first request comprises a vendor identifier and wherein the first request to perform the data operation comprises a request to perform the data operation on the first data that is in a format supported by an identified vendor.

In one embodiment, a response to the first request comprises a vendor identifier that is different from the vendor identifier of the first request.

In one embodiment, the response to the first request comprises at least some of the first data.

In one embodiment, the response to the first request comprises a locking status that indicates that the first data is not locked.

In one embodiment, the method further comprises sending, to the UDSF service node, a request to lock the first data, the request to lock the first data comprising first redirect information.

In one embodiment, the method further comprises receiving, from the UDSF service node, a confirmation that the first data is locked.

In one embodiment, the method further comprises sending, to the UDSF service node, a request to unlock the first data and delete the redirect information.

In one embodiment, the method further comprises receiving, from the UDSF service node, a confirmation that the first data is unlocked and that the redirect information is deleted.

In one embodiment, the response to the first request comprises a locking status that indicates that the first data is locked.

In one embodiment, the response to the first request comprises redirect information that identifies a network node for which the data has been locked.

In one embodiment, the redirect information comprises an IP or URL address of the network node for which the data has been locked.

In one embodiment, the method further comprises forwarding the first request to the network node for which the data has been locked or sending the redirect information to another NF node.

According to another aspect of the present disclosure, a network node for providing a NF in a telecommunications network comprises: one or more processors; and memory storing instructions executable by the one or more processors, whereby the node is operable to: send, to a UDSF service node for providing UDSF services, a first request to perform a data operation involving first data associated with an identified UE and an identified NF; and receive, from the UDSF service node, a response to the first request, the response comprising a locking status of the first data and/or redirect information.

In one embodiment, the first request comprises a request to create the first data, read the first data, update the first data, and/or delete the first data.

In one embodiment, the first request comprises a vendor identifier and wherein the first request to perform the data operation comprises a request to perform the data operation on the first data that is in a format supported by an identified vendor.

In one embodiment, a response to the first request comprises a vendor identifier that is different from the vendor identifier of the first request.

In one embodiment, the response to the first request comprises at least some of the first data.

In one embodiment, the response to the first request comprises a locking status that indicates that the first data is not locked.

In one embodiment, the network node is further operable to send, to the UDSF service node, a request to lock the first data, the request to lock the first data comprising first redirect information.

In one embodiment, the network node is further operable to receive, from the UDSF service node, a confirmation that the first data is locked.

In one embodiment, the network node is further operable to send, to the UDSF service node, a request to unlock the first data and delete the redirect information.

In one embodiment, the network node is further operable to receive, from the UDSF service node, a confirmation that the first data is unlocked and that the redirect information is deleted.

In one embodiment, the response to the first request comprises a locking status that indicates that the first data is locked.

In one embodiment, the response to the first request comprises redirect information that identifies a network node for which the data has been locked.

In one embodiment, the redirect information comprises an IP or URL address of the network node for which the data has been locked.

In one embodiment, the network node is further operable to forward the first request to the network node for which the data has been locked or to send the redirect information to another NF node.

According to another aspect of the present disclosure, a network node for providing a NF in a telecommunications network is adapted to: send, to a UDSF service node for providing UDSF services, a first request to perform a data operation involving first data associated with an identified UE and an identified NF; and receive, from the UDSF service node, a response to the first request, the response comprising a locking status of the first data and/or redirect information.

According to another aspect of the present disclosure, a network node for providing a NF in a telecommunications network comprises: means for sending, to a UDSF service node for providing UDSF services, a first request to perform a data operation involving first data associated with an identified UE and an identified NF; and means for receiving, from the UDSF service node, a response to the first request, the response comprising a locking status of the first data and/or redirect information.

According to another aspect of the present disclosure, a network node for providing a NF in a telecommunications network comprises: a sending module operable to send, to a UDSF service node for providing UDSF services, a first request to perform a data operation involving first data associated with an identified UE and an identified NF; and a receiving module operable to receive, from the UDSF service node, a response to the first request, the response comprising a locking status of the first data and/or redirect information.

According to another aspect of the present disclosure, a non-transitory computer readable medium stores software instructions that when executed by one or more processors of a network node for providing a NF in a telecommunications network cause the network node to: send, to a UDSF service node for providing UDSF services, a first request to perform a data operation involving first data associated with an identified UE and an identified NF; and receive, from the UDSF service node, a response to the first request, the response comprising a locking status of the first data and/or redirect information.

According to another aspect of the present disclosure, a computer program comprises instructions which, when executed by at least one processor, cause the at least one processor to carry out any of the methods described herein.

According to another aspect of the present disclosure, a carrier comprises the computer program described above, wherein the carrier is one of an electronic signal, an optical signal, a radio signal, or a computer readable storage medium.

According to another aspect of the present disclosure, a method for Network Repository Function (NRF) services in a telecommunications network comprises: receiving, at a NRF node having circuitry and from a first NF, a service discovery request, the service discovery request identifying a NF type and a vendor; searching for a second NF that provides NF services of the identified NF type using a data format that is supported by the identified vendor; upon determining that a second NF that provides NF services of the identified NF type using the data format that is supported by the identified vendor exists, sending, to the first NF, the identity of a second NF; and, upon determining that a second NF that provides NF services of the identified NF type using the data format that is supported by the identified vendor does not exist, sending, to the first NF, an indication that a node providing NF services of the identified NF type using the data format that is supported by the identified vendor does not exist.

According to another aspect of the present disclosure, a method for UDSF services in a telecommunications network comprises: at a UDSF node for providing UDSF services and having circuitry: receiving, from a first network node, a first request to perform a data operation involving first data associated with an identified UE and an identified NF, the request identifying a vendor; determining whether first data associated with an identified UE and an identified NF, and in a data format that is supported by the identified vendor exists; upon determining that first data associated with the identified UE and the identified NF, and in a data format that is supported by the identified vendor exists, sending, to the first network node, a response to the first request, the response comprising a locking status of the first data and/or redirect information; and upon determining that first data associated with the identified UE and the identified NF, and in the data format that is supported by the identified vendor does not exist, sending, to the first network node, a response to the first request, the response comprising: an indication that first data associated with the identified UE and the identified NF, and in the data format that is supported by the identified vendor does not exist; and/or redirect information identifying a second UDSF node that supports data associated with the identified UE and the identified NF, and in the data format that is supported by the identified vendor.

Those skilled in the art will appreciate the scope of the present disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Figure 1:
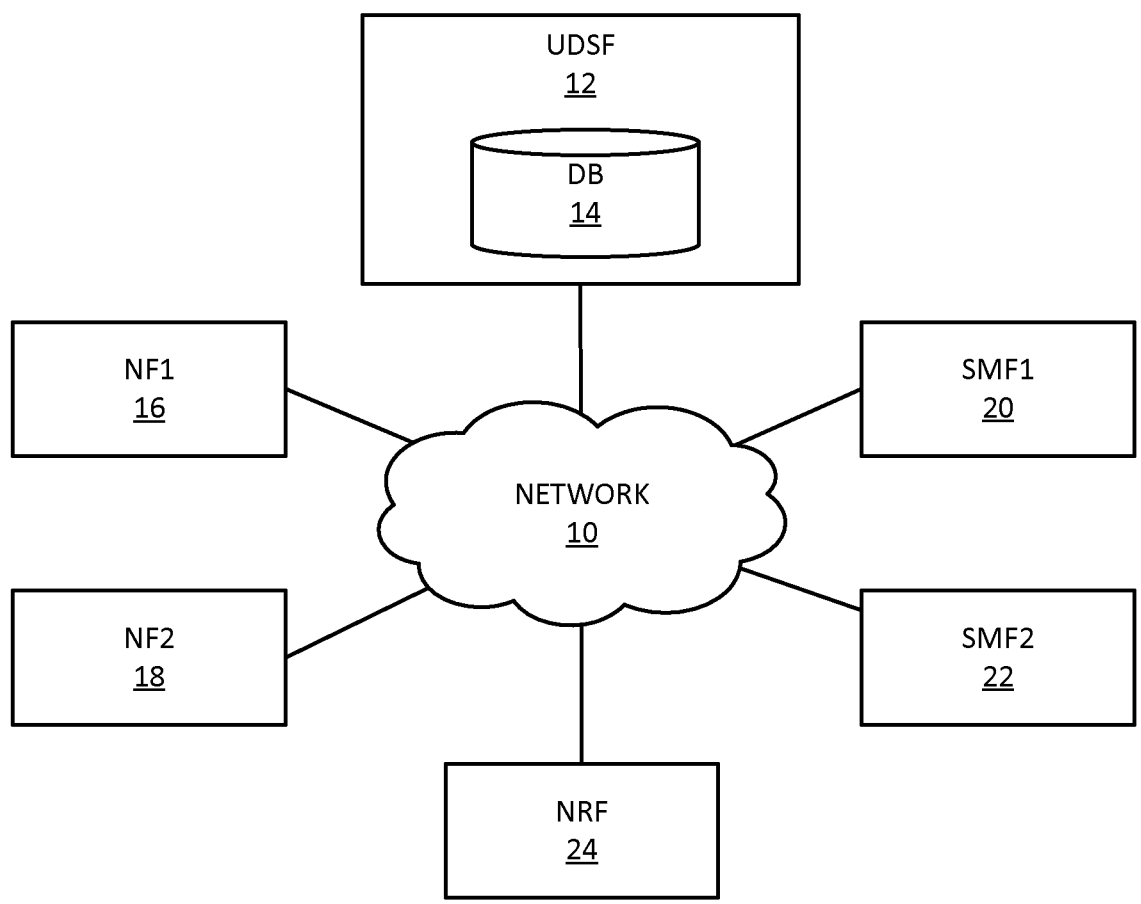
FIG. 1 illustrates a block diagram of an exemplary system for providing Unstructured Data Storage Function (UDSF) services in a telecommunications network according to an embodiment of the present disclosure.

FIG. 1 illustrates a block diagram of an exemplary system for providing Unstructured Data Storage Function (UDSF) services in a telecommunications network according to an embodiment of the present disclosure. In the embodiment illustrated in FIG. 1, a telecommunications network 10 includes a UDSF node 12 for providing UDSFs to other nodes in the network 10. In one embodiment, the UDSF node 12 may include or communicate with a database (DB) 14 for storing unstructured data. In one embodiment, the DB 14 may also store structured data.

The network 10 typically includes a number of nodes that provide a variety of Network Functions (NFs). In the embodiment illustrated in FIG. 1, for example, the network 10 includes a pair of generic NFs (a first NF (NF1) 16 and a second NF (NF2) 18), as well as a pair of specific NFs (a first Session Management Function (SMF1) 20 and a second SMF (SMF2) 22). In the embodiment illustrated in FIG. 1, the network 10 also includes a NF Repository Function (NRF) 24, which maintains information about which types of NFs are currently supported in the network 10 as well as which nodes provide which functions. It will be understood that the subject matter described herein is not limited to just the particular set of NFs just described; any combination or number of any type of NF is within the scope of the subject matter of the present disclosure.

Example Operation

FIGS. 2-6 illustrate portions of an exemplary method for providing UDSF services in a telecommunications network according to an embodiment of the present disclosure.

Figure 2:
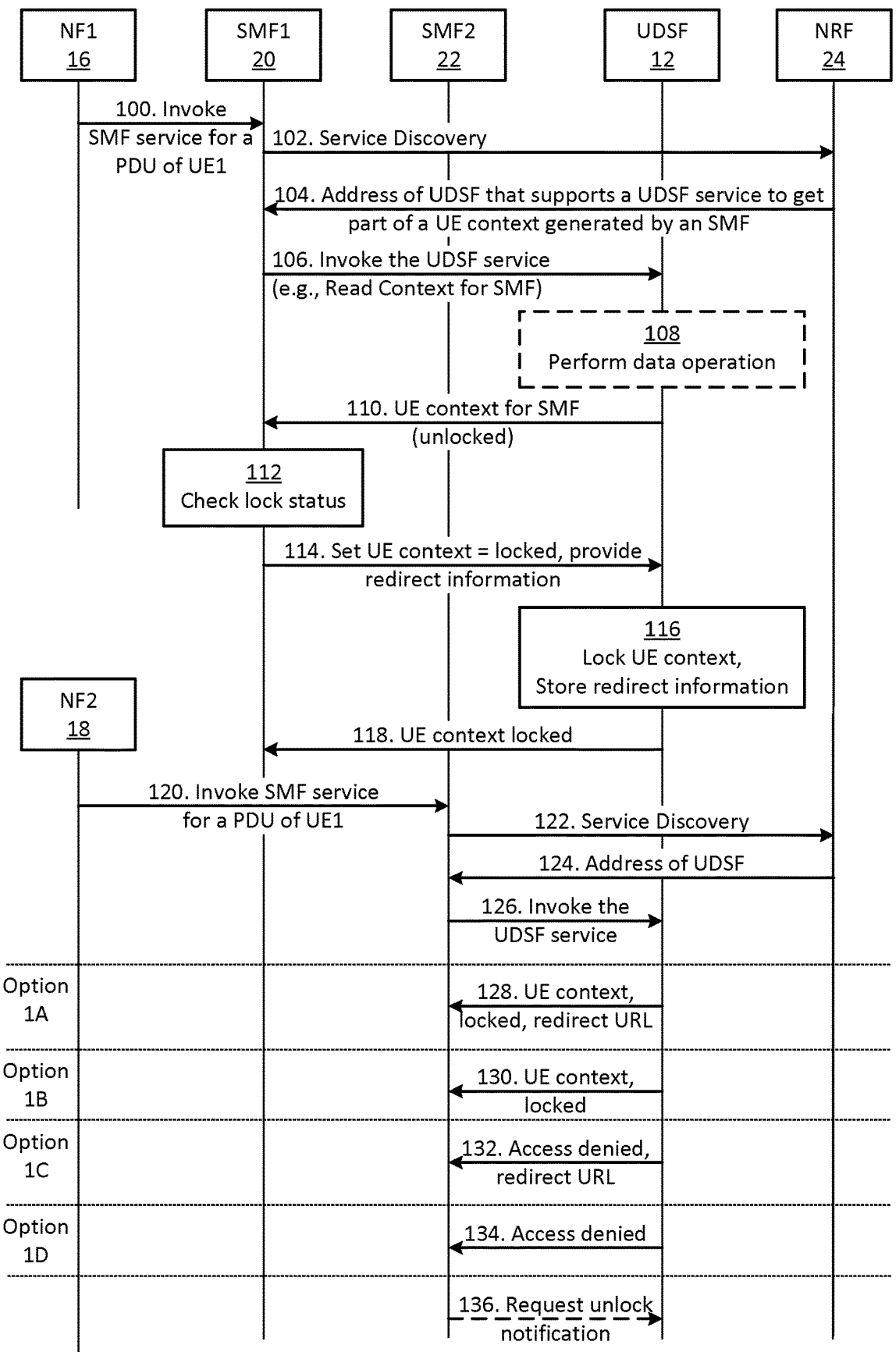
FIGS. 2-6 illustrate portions of an exemplary method for providing UDSF services in a telecommunications network according to an embodiment of the present disclosure.

FIG. 2 illustrates a portion of an exemplary method for providing UDSF services in a telecommunications network according to an embodiment of the present disclosure. In the embodiment illustrated in FIG. 2, the NF1 16 sends a request 100 to the SMF1 20, where the request 100 is a request to invoke an SMF service for a Protocol Data Unit (PDU) of a first User Equipment (UE1).

In one embodiment, in order to provide the SMF service for the UE1, the SMF1 20 attempts to determine whether or not a NF-specific context (in this example, an SMF-specific context) for the particular UE (in this example, UE1) has been previously created and stored somewhere (e.g., in a UDSF node). In the embodiment illustrated in FIG. 2, the SMF1 20 issues a Service Discovery message 102 to the NRF 24, which will return the address of a UDSF that stores SMF-specific contexts. In the scenario illustrated in FIG. 2, the NRF 24 returns the address of UDSF 12 in a service discovery response message 104. The address may be a Uniform Resource Locator (URL), an Internet Protocol (IP) address, another type of network address, a network name, or any other type information that identifies a UDSF or other type of node. In one embodiment, the address may be a null address or other indication that a UDSF that stores the NF-specific context does not exist or is not available.

In the embodiment illustrated in FIG. 2, the SMF1 20 receives the address of the UDSF 12 in the message 104 and issues a request 106 to perform a data operation involving first data associated with an identified UE and an identified NF. The data operation may be a service provided by the UDSF 12, and making a request to perform such a data operation may also be referred to as invoking a service provided by the UDSF 12. In the example illustrated in FIG. 2, the request 106 issued by the SMF1 20 comprises a request to perform a data operation (e.g., a request to READ data) involving data associated with an identified UE (e.g., UE1) and an identified NF (e.g., an SMF). Thus, the request 106 shown in FIG. 2 is a request to read the SMF context for UE1.

Requests for a UDSF, such as the UDSF 12, to perform data operations are commonly referred to as requests for a UDSF service. A particular UDSF typically makes public which services it provides, and one UDSF may offer different services from another UDSF. In one embodiment, a UDSF service can be defined per NF type, where NFs of that NF type may invoke this service as the service consumer. In one embodiment, such a service may be named a Session Context storage service, and may optionally include the NF type name. For example, a service stores or retrieves session contexts for a SMF may be named "Nusdf_Session_Context_forSMF." In one embodiment, the NF-specific service can only be invoked by the corresponding NF; i.e., the service above may be invoked only by an SMF. Alternatively, a service may be defined generically, e.g., "Nusdf_Session_Context" and accept a parameter that specifies the NF type, e.g., "Nusdf_Session_Context(Type: =SMF, . . . )." In one embodiment, other parameters may be required or optional. Example parameters include, but are not limited to, a UE Identifier (ID), such as a Subscriber Permanent Identifier (SUPI), a PDU session ID, etc. Using the Session Context storage service described above, the service may be invoked by a NF (as service consumer), which provides the NF type and UE ID. In one embodiment, the service returns the session context relevant to the input parameters, e.g., the session context relevant to the particular NF for the particular UE.

Examples of data operations include, but are not limited to Create, Read, Update (write), and Delete (CRUD). In the examples presented herein, the first data associated with an identified UE and an identified NF comprises a context, which may also be referred to as "context data," but the subject matter described herein is not so limited: other types of unstructured data may be operated upon. As used herein, the term "context" refers to any data that is particular to identified UE and NF. Examples of context data include, but are not limited to, an identity of the UE, an identity of the access point or point of egress into a network, an indication of a Quality of Service (QoS) of a communication to/from the UE, an identity of a party with which the UE is communicating, and so on. Thus, in one example, a NF (as a service consumer) can invoke the Nudsf_Session_Context service with parameters <NF type><UE id> to CRUD the Session Context for a given NF type and the UE. For example, when a new PDU Session is created, at least new Session Context information for the SMF (where the PDU Session is anchored) and this UE (identified by UE ID) is created.

Regardless of the type or particulars of the unstructured data, the unstructured data may comprise a first portion that is proprietary, encrypted, or otherwise usable only by a particular NF and/or by a particular vendor and a second portion that is usable by all. Alternatively, the unstructured data may be wholly in a form usable by all; likewise, the unstructured data may be wholly in a form that is NOT usable by all, e.g., in a vendor-proprietary format.

Examples of data that is usable by all include, but are not limited to, data encoded in plain text and/or encoded using a format that is publically available or in a format that renders the content to be easily understood upon trivial analysis, such as data encoded as Extensible Markup Language (XML), JavaScript Object Notation (JSON), and the like. Examples of proprietary data include, but are not limited to, data stored in compressed or binary form having a structure and/or format that is not publically available, data that requires a decryption key to decode, and/or data that is not readily susceptible to analysis.

In the embodiment illustrated in FIG. 2, for example, an SMF context for a UE and an Access and Mobility Management Function (AMF) context for the same UE are likely to contain different information. Likewise, the format and/or content of a context used by a NF from one vendor is likely to be different from the format and/or context used by the same NF but from another vendor. Thus, where the unstructured data comprise a first portion that is proprietary and a second portion that is not proprietary, in one embodiment, the second, non-proprietary portion may be stored as metadata separate from the first, proprietary portion. For example, the non-proprietary portion may be stored in a header for the proprietary portion, which is stored in the payload. By separating the proprietary portion from the non-proprietary portion (e.g., separating payload from header), an NRF and/or a UDSF can make more discriminating decisions regarding where to store data for particular NFs from particular vendors. (This concept will be discussed in more detail starting in FIG. 5, below.)

In one embodiment, data that is stored within the UDSF 12 may be accessed or acted upon by more than one entity at the same time. Using the Session Context example described above, for example, in one embodiment, the Session Context for a particular UE may be then accessed by multiple NFs (of same type, e.g. SMFs), even at the same time. In this scenario it is desirable to ensure that at certain point of time, there is only one NF of the same type can operate on the Session Context, especially for Update and deletion operations. Thus, in one embodiment, the Session Context information stored in the UDSF 12 includes a "lock," so that when a NF (service consumer) fetches the UE context, it shall check if said "lock" is on (alternatively, that the information "is locked"); if it is on, it indicates the Session Context (for that particular UE and NF type) is under modification or other operations by another instance of the same type of NF type. In one embodiment, the "lock" may be an attribute that is stored as part of Session Context information; alternatively, the "lock" may be an attribute that applies to the Session Context information but is not stored within the Session Context information. Other implementations of a locking mechanism are also contemplated.

Thus, in the scenario illustrated in FIG. 2, the UDSF 12 has stored the SMF context for UE1, in which case the UDSF 12 performs the data operation 108 (i.e., to allow the SMF1 20 to read the SMF context for UE1) and sends the requested SMF context for UE1 (message 110), along with an indication of the lock status of the requested data. In the embodiment illustrated in FIG. 2, the message 110 indicates to SMF1 20 that the SMF context for UE1 is in an "unlocked" state, meaning that this data is not currently locked for use by another node. Reading the lock status and/or setting the lock status to locked or unlocked may be implemented as individual service operations and/or implemented as part of operations that modify (e.g., CRUD) the unstructured data.

As used herein, stating that data is "locked" or "in a locked state" indicates that the data is either in a "read only" state or that the data is inaccessible, depending on the specific implementation, to entities other than the entity that locked the data (or requested that the data be locked). For example, in one embodiment, only the entity that locked the data may update or delete the locked data: other entities may only read the locked data. In an alternative embodiment, only the entity that locked the data may read, update, or delete the locked data: other entities are denied all access, including read access.

As used herein, stating that data is "unlocked" or "in an unlocked state" indicates that the data is not in a locked state, e.g., that the data may be read, updated, and deleted. It should be noted that other terms may be used to convey locked and unlocked status. For example, locked data may also be referred to as "reserved data," "read only data," "access controlled data," "access prohibited data," "private data," etc., and unlocked data may also be referred to as "read/write data," "public data," and the like.

Alternatively, if the UDSF 12 did not happen to have a stored SMF context for UE1, the data operation 108 may not have been performed (or may have been performed but not successfully, i.e., the requested SMF context for UE1 would not have been provided to SMF1 20, the requesting entity). In that scenario, in one embodiment the UDSF 12 may instead send a "request failed" message to the SMF1 20. In yet another embodiment, if a network has multiple UDSF nodes and if the UDSF 12 generally stores SMF contexts but did not happen to have the SMF context for the UE1, the UDSF 12 may report "context not found" or similar status to the SMF1 20, which may then issue another Service Discovery request to find another UDSF node to try. These examples of how the UDSF 12 might respond to a determination that it does not currently store a NF-specific context for a particular UE are intended to be illustrative and not limiting. Other responses to this scenario are also contemplated by the present disclosure and are considered to be within the scope of the subject matter described herein.

Returning to FIG. 2, in one embodiment the SMF1 20 receives the requested SMF context for UE1 (message 110) and checks the lock status (block 112). In the embodiment illustrated in FIG. 2, the SMF1 20 responds to a determination that the SMF context for UE1 is unlocked by sending to the UDSF 12 a message 114 requesting that the SMF context for UE1 be locked (i.e., to set the locking status to "locked").

In the embodiment illustrated in FIG. 2, the message 114 also provides "redirect information" to the UDSF 12, which in this example is the address of the entity that has locked the particular data (the SMF context for UE1)—namely, the address of SMF1 20. As will be seen in more detailed examples below, storing the address of the entity that has locked the data provides some flexibility in situations where multiple nodes desire access to the same data at the same time.

In the embodiment illustrated in FIG. 2, the UDSF 12 responds to the message 114 by locking the SMF context for UE1 and storing the redirect information (block 116) and then notifying the SMF1 20 that the SMF context for UE1 has been locked and that the redirect information has been stored (message 118).

FIG. 2 also illustrates what may happen when another NF, in this example, the NF2 18, attempts to access the same unstructured information (e.g., the SMF context for UE1). In the embodiment illustrated in FIG. 2, the NF2 18 issues its own request 120 to read the SMF context for UE1. In the scenario illustrated in FIG. 2, the NF2 18 makes this request to a different SMF, i.e., to SMF2 22. The SMF2 22 responds by engaging in its own Service Discovery request (message 122), which results in the NRF 24 providing to the SMF2 22 the address of the UDSF 12 (message 124).

In the embodiment illustrated in FIG. 2, the SMF2 22 invokes the UDSF service (in this example, to read the SMF context for UE1) via request 126. This time, however, the UDSF 12 determines that the SMF context for UE1 is currently locked by SMF1 20. In this situation, the UDSF 12 may respond in a variety of ways:

Option 1A: the UDSF 12 may provide the requested information along with an indication that the requested information is currently locked and including the redirect information provided by the entity that locked the requested information (message 128);

Option 1B: the UDSF 12 may provide the requested information along with an indication that the requested information is currently locked, but NOT provide the redirect information (message 130);

Option 1C: the UDSF 12 may respond with an "access denied" message that does NOT include the requested information but that does include the redirect information (message 132); or Option 1D: the UDSF 12 may respond with an "access denied" message that does not include the requested information, but NOT provide the redirect information (message 134).

It will be understood that Options 1A-1D above are intended to be illustrative and not limiting, and that alternative responses are also contemplated by the present disclosure and are considered to be within the scope of the subject matter described herein. It will also be understood that the UDSF 12 may respond in the same manner every time or the UDSF 12 may respond in a different manner, e.g., depending on specific circumstances, application of different rules, and so on.

In one embodiment, if the desired information is locked, the requesting NF may opt to wait until the lock is free again, in which case the NF may request to be notified by the UDSF when the desired information is unlocked. In the embodiment illustrated in FIG. 2, the SMF2 22 sends such a notification request (message 136) to the UDSF 12. Once the desired information is unlocked the UDSF 12 may notify the SMF2 22 of this fact (not shown in FIG. 2), after which the SMF2 22 may make the desired service requests to the UDSF 12. In an alternative embodiment, a NF may request a deferred operation, i.e., one that will be automatically executed by the UDSF 12 as soon as the unstructured data at issue becomes unlocked.

Figure 3:
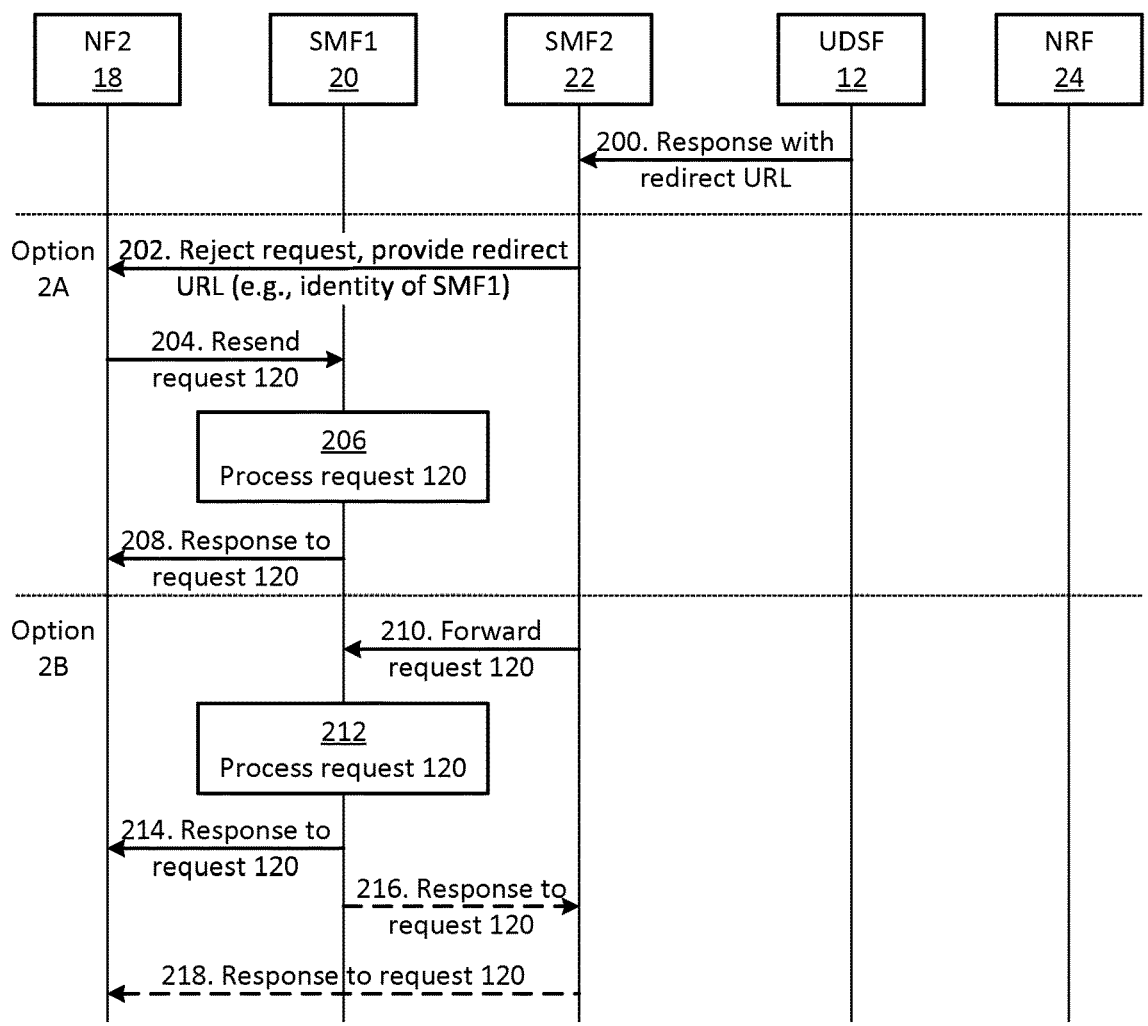

FIG. 3 illustrates another portion of an exemplary method for providing UDSF services in a telecommunications network according to an embodiment of the present disclosure.

FIG. 3 illustrates how an NF may respond upon receiving a response to a request for unstructured data (in this example, a response for the SMF context for UE1) that indicates that the data is currently locked. In the embodiment illustrated in FIG. 3, SMF2 22 receives from the UDSF 12 a response 200 that includes a redirect URL, which indicates that the requested information is currently locked.

Option 2A: the SMF2 22 responds to the requesting entity (in this example, the NF2 18) with a rejection (message 202) of the original request (message 120), the rejection including the redirect information (e.g., the URL of the SMF1 20, which has locked the information sought by the SMF2 22). In one embodiment, the NF2 18 then resends the original request 120 to SMF1 20 (message 204). In response, the SMF1 20 may process the request (block 206) and send the result of the processing to the NF2 18 (message 208).

Option 2B: the SMF2 22 forwards the original request 120 to the SMF1 20 (message 210), which may process the request (block 212) and send (message 214) the result of the processing to the original requesting entity, i.e., the NF2 18. Alternatively, the SMF1 20 may process the forwarded request and send the result of the processing to the SMF2 22 (message 216), which forwards the result to NF2 18 (message 218).

Figure 4:
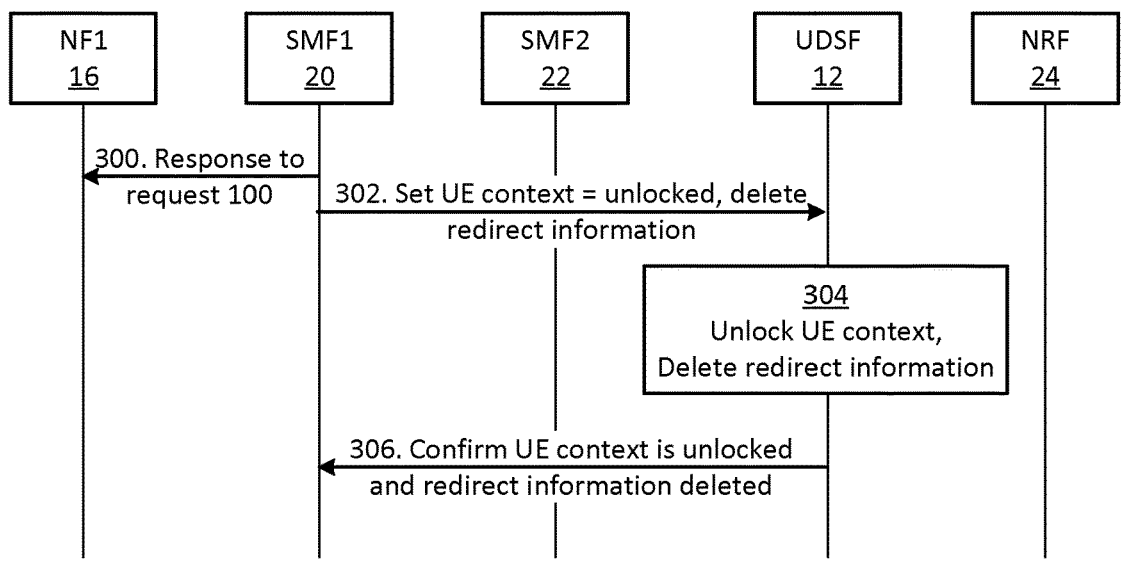

FIG. 4 illustrates another portion of an exemplary method for providing UDSF services in a telecommunications network according to an embodiment of the present disclosure. FIG. 4 illustrates a process by which locked data may be unlocked (e.g., after performing the steps shown in FIG. 2). In the embodiment illustrated in FIG. 4, the SMF1 20 has performed the SMF service in response to original request 100 and therefore sends the response (message 300) to the NF1 16. In the embodiment illustrated in FIG. 4, the SMF1 20 then sends to the UDSF 12 a request (message 302) to unlock the SMF context for the UE1 and to delete the redirect information that was previously stored by the UDSF 12. In the embodiment illustrated in FIG. 4, the UDSF 12 unlocks the SMF context for the UE1 and deletes the redirect information (block 304) and then notifies the SMF1 20 (message 306) that the request has been completed.

Vendor-Specific Data

As stated above, not only is the data stored by one type of NF likely to be different from the data stored by another type of NF, the data stored by a NF made by one vendor is likely to be different from the data stored by the same type of NF made by another vendor. Thus, there are benefits to taking into account the identity of the vendor of the NF during data storage and service discovery. Such embodiments are illustrated in FIGS. 5 and 6, below.

Figure 5:
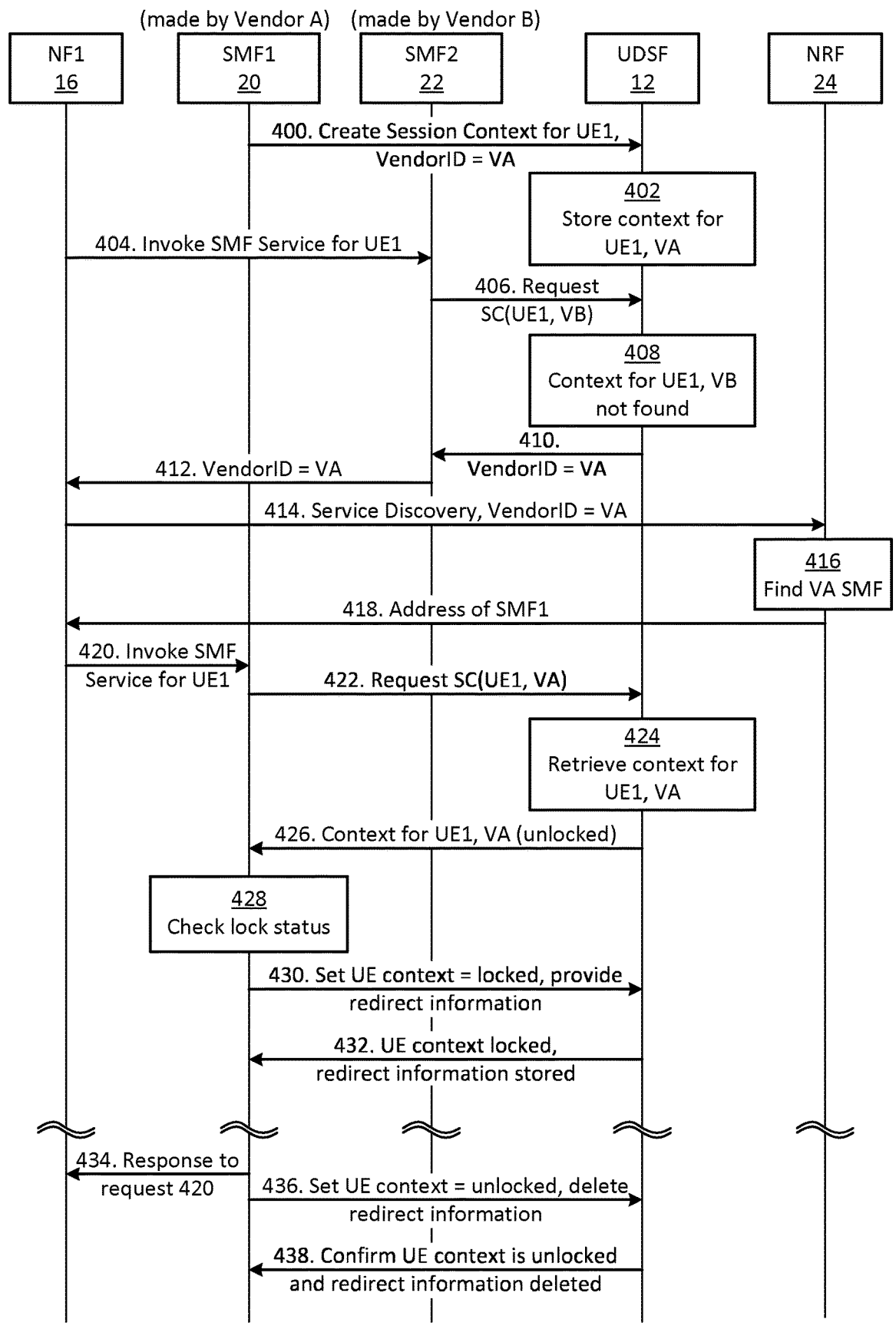
Figure 6:
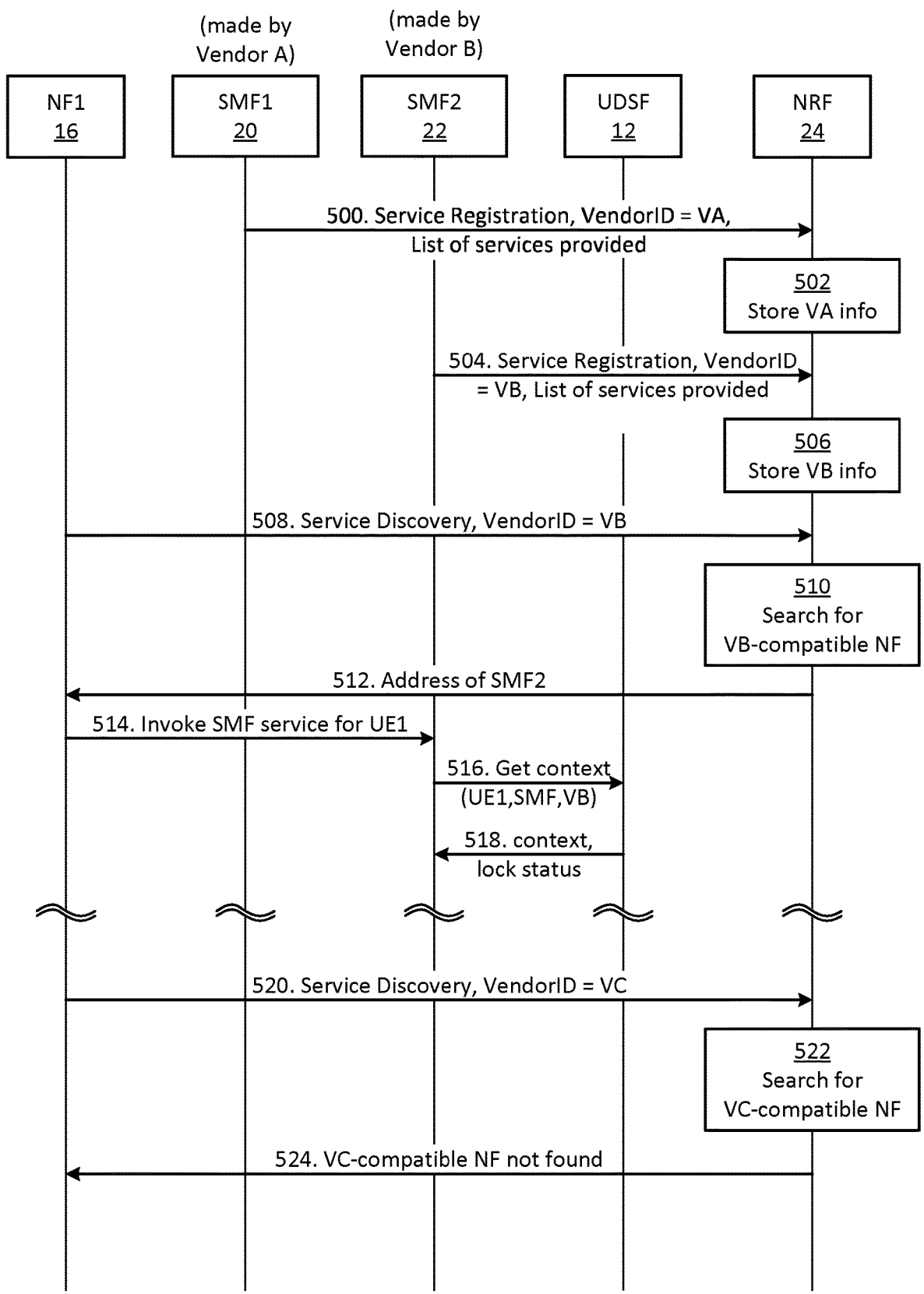

FIG. 5 illustrates another portion of an exemplary method for providing UDSF services in a telecommunications network according to an embodiment of the present disclosure. In the embodiment illustrated in FIG. 5, SMF1 20 is produced by Vendor A (whose vendor identifier (VendorID) is "VA") and SMF2 22 is produced by Vendor B (whose VendorID is "VB"). In this example, each vendor stores SMF context data in its own proprietary format that the other vendor does not know how to interpret. The process illustrated in FIG. 5 begins when the SMF1 20 creates an SMF session context for UE1 by sending message 400. In the embodiment illustrated in FIG. 5, the message 400 includes the VendorID "VA." At block 402, the UDSF 12 stores the context for UE1 (e.g., in Vendor A's proprietary format) and also stores the VendorID "VA." In this example, the SMF1 20 does not at this time request that the stored context be locked, and therefore the SMF context for UE1 is not yet in the locked state.

In the embodiment illustrated in FIG. 5, the NF1 16 sends a message 404 to SMF2 22 requesting SMF service for UE1. (It is assumed that the SMF2 22 has already performed a Service Discovery to learn the address of the UDSF 12.)

In the embodiment illustrated in FIG. 5, the SMF2 22 sends a request (message 406) to the UDSF 12, requesting retrieval of an SMF context for UE1 and including a vendor identifier "VB," indicating that the SMF2 22 is produced by the VB. The UDSF 12 determines that an SMF context for UE1 is available, but in a format used by Vendor A, not by Vendor B (block 408), and so sends to SMF2 22 a response (message 410) indicating that the SMF context for UE1 that the UDSF 12 has access to is in a format used by Vendor A (e.g., VendorID=VA). In an alternative embodiment, the request 406 does not specify a VendorID. In this embodiment, the USDF 12 would search for the context for UE1 regardless of VendorID in step 408, and would return the context, along with the VendorID of the vendor that created the context (in this example, "VA") in response message 410.

In the embodiment illustrated in FIG. 5, the SMF2 22 notifies the NF1 16 (message 412) that the SMF context for UE1 is in a format used by Vendor A. In one embodiment, the SMF2 22 may be unable to understand the contents of the returned context—e.g., because the contents are in a proprietary format which the SMF2 22 cannot read—but because the VendorID (and other meta-data) is readable by all, the SMF2 22 can at least determine whether or not the context is locked and can also read the VendorID that it received in message 410.

In the embodiment illustrated in FIG. 5, the NF1 16 understands that it needs to use an SMF created by Vendor A instead of the SMF2 22, which is an SMF created by Vendor B. Thus, in the embodiment illustrated in FIG. 5, the NF1 16 sends to the NRF 24 a Service Discovery request that specifies the Vendor A (message 414). The NRF 24 searches for an SMF from Vendor A (block 416) and sends to the NF1 16 the address of the SMF1 20 (message 418).

In the embodiment illustrated in FIG. 5, the NF1 16 sends to the SMF1 20 a request (message 420) to invoke an SMF service for the UE1. In response, the SMF1 20 sends to the UDSF 12 a UDSF service request (message 422) to read the SMF context for UE1. In response, the UDSF 12 retrieves the context for UE1, which is in the format used by Vendor A (block 424) and sends the retrieved, VA-format context for the UE1 to the SMF1 20 (message 426) along with an indication that the SMF context for UE1 is unlocked (as the SMF1 20 has not yet requested that it be locked).

In the embodiment illustrated in FIG. 5, the SMF1 20 checks the lock status (block 428), determines that the SMF context for the UE1 is unlocked, and thus sends to the UDSF 12 a request (message 430) to lock the SMF context for UE1. The message 430 also includes the address of the SMF1 20, which the UDSF 12 stores as redirect information associated with the locked SMF context for the UE1. The UDSF 12 notifies the SMF1 20 that the SMF context for the UE1 is locked and that the redirect information has been stored (message 432).

Sometime later, the SMF1 20 provides to the NF1 16 a response (message 434) to the original SMF service request 420. In the embodiment illustrated in FIG. 5, the SMF1 20 then sends to the UDSF 12 a request (message 436) to unlock the SMF context for UE1 and to delete the stored redirect information, which the UDSF 12 does. The UDSF 12 then notifies the SMF1 20 that the SMF context for the UE1 has been unlocked and that the redirect information has been deleted (message 438).

In the example embodiment illustrated in FIG. 5, one UDSF 12 services equipment made by different vendors. In an alternative embodiment, a network operator may deploy multiple UDSF node, one per vendor, i.e., where each vendor has their own vendor-specific UDSF. In such embodiments, the vendor may configure their network in such a way as to ensure that a UE is always served by the same vendor. This could be achieved by Network Slice Selection Assistance (NSSA) information, e.g., different vendors are allocated with different network slice IDs.

FIG. 6 illustrates a vendor-specific service discovery procedure according to an embodiment of the present disclosure. In the embodiment illustrated in FIG. 6, the SMF1 20 provides the NRF 24 with the VendorID of the vendor of the SMF1 20 (e.g., VA) along with a list of services provided by SMF1 20 (message 500), which the NRF 24 stores (block 502). Likewise, the SMF2 22 provides the NRF 24 with the VendorID of the SMF2 22 (e.g., VB) along with a list of services provided by the SMF1 22 (message 504), which the NRF 24 stores (block 506).

When the NF1 16 needs to find an SMF, it sends to the NRF 24 a Service Discovery request (message 508) that identifies the vendor type required or preferred by the NF1 16, which in this example is the VB. The NRF 24 searches for a VB-compatible SMF (block 510) and sends to the NF1 16 the address of the SMF2 22 (message 512). The NF1 16 sends to the SMF2 22 a request (message 514) to invoke an SMF service for the UE1.

The SMF2 22 sends to the UDSF 12 a request to get the SMF context for the UE1 (message 516), which the UDSF 12 provides (message 518) along with the lock status.

In the embodiment illustrated in FIG. 6, the NF1 16 next sends to the NRF 24 another Service Discovery request (message 520), this time specifying that it requires or prefers a node produced by, or that supports a format used by, Vendor C (VC). The NRF 24 searches for a VC-compatible NF (block 522), but finding none, notifies the NF1 16 that it could not find a VC-compatible NF (message 524).

The above figures illustrate exemplary interactions involving an attempt to modify an existing context that is or is not locked, that is by the same vendor or by a different vendor, etc., but timing issues can also cause conflicts.

In one scenario, SMF1 20 could create a context, lock the context, use the context then unlock the context. SMF2 22 could then read the context and later delete the context. If SMF1 20 tries to read the deleted context, in one embodiment, the UDSF 12 may reject the read request as obsolete.

In another scenario, the UE1 may request service from SMF1 20, but because of network or processing load, SMF1 20 does not issue a request to UDSF 12 to create an SMF context for the UE1. After a timeout, the UE1 requests SMF service from the SMF2 22, which promptly contacts the UDSF 12 and creates an SMF context for the UE1. SMF1 20 eventually contacts the UDSF 12 and attempts to create an SMF context from the UE1. There are various ways that the UDSF 12 may respond to the tardy request from the SMF1 20.

For example: in one embodiment, the UDSF 12 could simply reject the later create request from the SMF1 20; in another embodiment, the UDSF 12 could reject the create request but respond with the existing context created by the SMF2 22; in yet another embodiment, the UDSF 12 could check the current lock status of the existing context and reject the request if locked but overwrite the existing context with a new context if the existing context is unlocked.

In yet another embodiment, timestamp information may be used to distinguish an earlier CREATE request from a later create request. For example, in one embodiment, each create request could contain a timestamp provided by the requestor or timestamped by the UDSF 12 upon receipt. In one embodiment, if the context does not already exist, the response could contain the created context, and if the context does already exist, the response could contain the previously created context along with the timestamp that indicates the date and time of its creation. In this manner, a requesting entity can tell whether the context returned was previously created (includes timestamp) or not (does not include timestamp).

In one embodiment, if the context returned includes a timestamp, the requesting entity can compare the returned timestamp to the timestamp that it included in its request, and if the timestamp that came back with the returned context is newer than the timestamp of the entity's request, the requesting entity can treat its own request as already obsolete, e.g., and choose not to overwrite the context created by the other entity. On the other hand, if the timestamp that came back with the returned context is older than the timestamp of the entity's request, the entity may presume that the existing context data is already obsolete, e.g., and choose to update the context stored in the UDSF 12.

Figure 7:
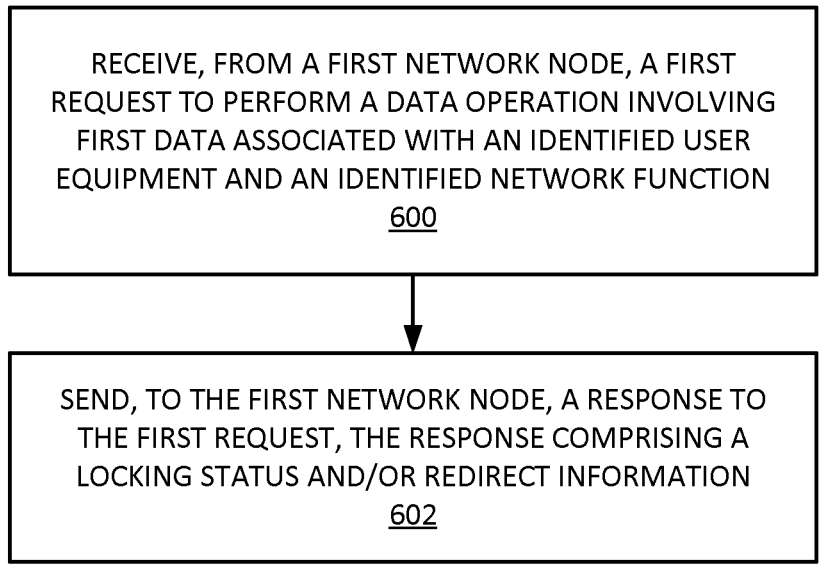
FIG. 7 illustrates a flow chart of an exemplary method for providing UDSF services in a telecommunications network according to another embodiment of the present disclosure.

FIG. 7 illustrates a flow chart of an exemplary method for providing UDSF services in a telecommunications network according to another embodiment of the present disclosure. In the embodiment illustrated in FIG. 7, the process includes, at block 600, receiving, from a first network node, a first request to perform a data operation involving first data associated with an identified UE and an identified NF. The process further includes, at block 602, sending, to the first network node, a response to the first request, the response comprising a locking status and/or redirect information.

Figure 8:
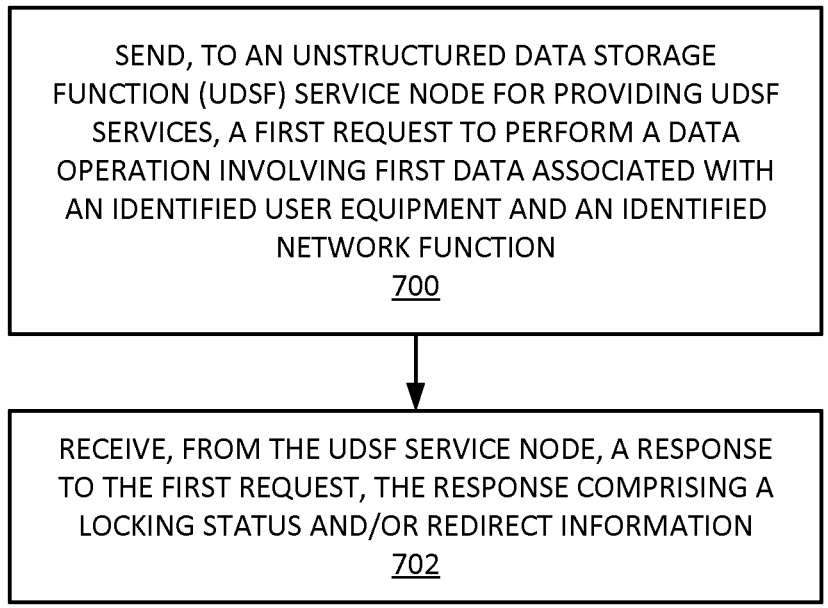
FIG. 8 illustrates a flow chart of an exemplary method for providing UDSF services in a telecommunications network according to another embodiment of the present disclosure.

FIG. 8 illustrates a flow chart of an exemplary method for providing UDSF services in a telecommunications network according to another embodiment of the present disclosure. In the embodiment illustrated in FIG. 8, the process includes, at block 700, sending, to a UDSF service node for providing UDSF services, a first request to perform a data operation involving first data associated with an identified UE and an identified NF. The process further includes receiving, from the UDSF service node, a response to the first request, the response comprising a locking status and/or redirect information.

Figure 9:
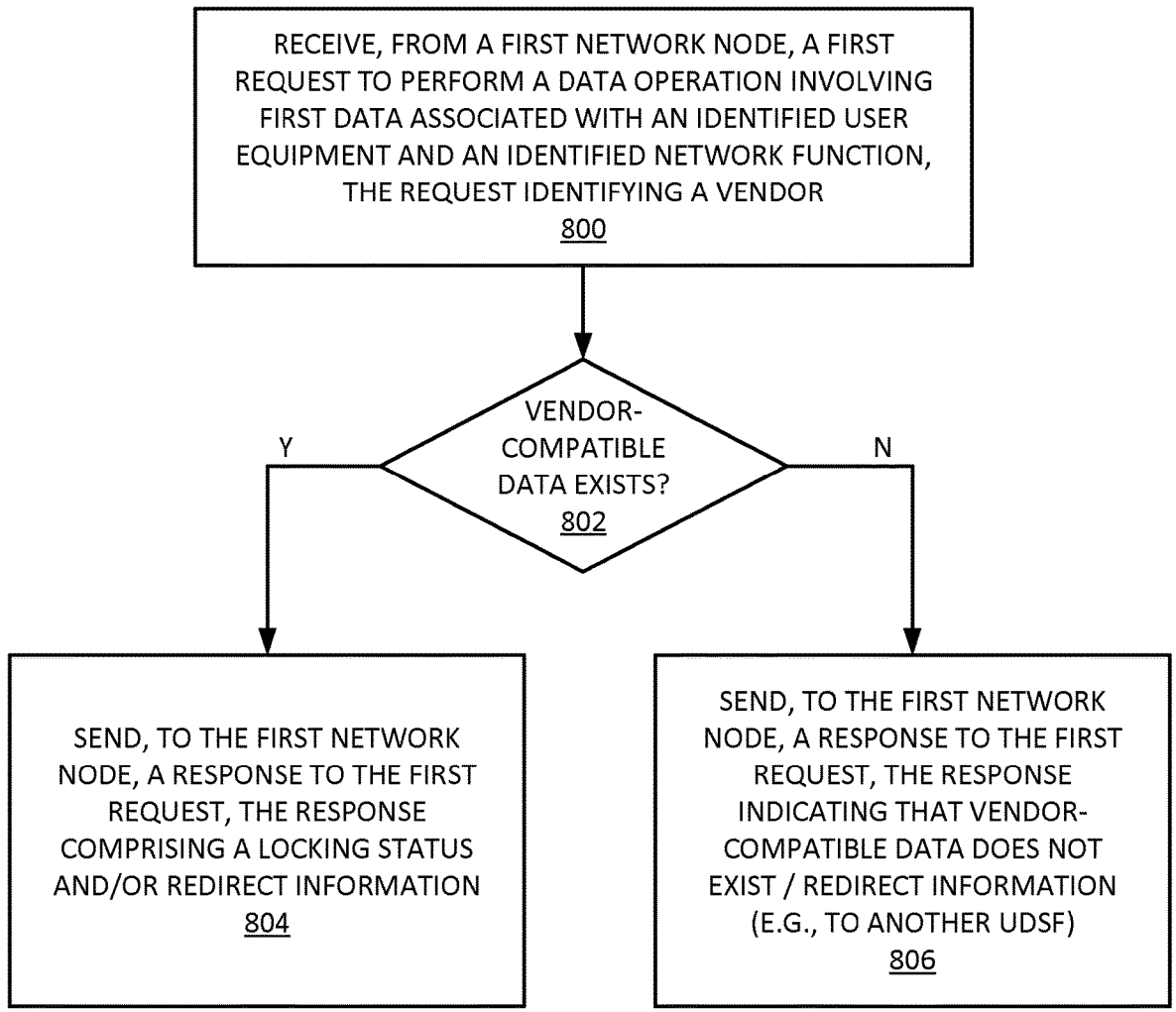
FIG. 9 illustrates a flow chart of an exemplary method for providing UDSF services in a telecommunications network according to another embodiment of the present disclosure.

FIG. 9 illustrates a flow chart of an exemplary method for providing UDSF services in a telecommunications network according to another embodiment of the present disclosure. In the embodiment illustrated in FIG. 9, the process includes, at block 800, receiving, from a first network node, a first request to perform a data operation involving first data associated with an identified UE and an identified NF, the request identifying a vendor. The process includes determining, at block 802, whether or not vendor-compatible data exists. If yes, the process goes to block 804, which comprises sending, to the first network node, a response to the first request, the response comprising a locking status and/or redirect information. If no, the process goes to block 806, which comprises sending, to the first network node, a response to the first request, the response indicating that vendor-compatible data does not exist, and/or redirect information (e.g., to another UDSF).

Figure 10:
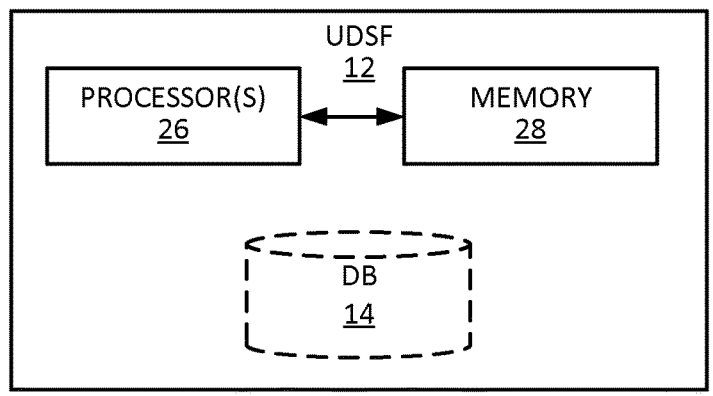
FIG. 10 illustrates a block diagram of an exemplary UDSF services node according to an embodiment of the present disclosure.

FIG. 10 is a schematic block diagram of an exemplary UDSF 12 according to some embodiments of the present disclosure. As illustrated, the UDSF 12 includes one or more processors 26 (e.g., Central Processing Units (CPUs), Application Specific Integrated Circuits (ASICs), Field Programmable Gate Arrays (FPGAs), Digital Signal Processors (DSPs), and/or the like) and memory 28. In some embodiments, the functionality of the UDSF 12 described above may be implemented in hardware (e.g., via hardware within the processor(s) 26) or be implemented in a combination of hardware and software (e.g., fully or partially implemented in software that is, e.g., stored in the memory 28 and executed by the processor(s) 26).

In some embodiments, a computer program including instructions which, when executed by the at least one processor 26, causes the at least one processor 26 to carry out at least some of the functionality of the UDSF 12 according to any of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as memory).

Figure 11:
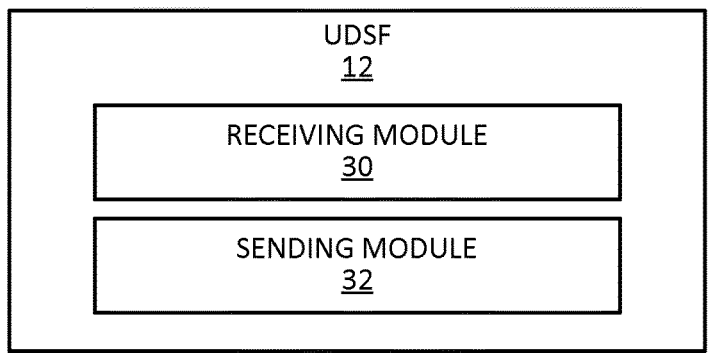
FIG. 11 illustrates a block diagram of an exemplary UDSF services node according to another embodiment of the present disclosure.

FIG. 11 is a schematic block diagram of the UDSF 12 according to some other embodiments of the present disclosure. The UDSF 12 includes one or more modules, each of which is implemented in software. In the embodiment illustrated in FIG. 11, the UDSF 12 includes a receiving module 30 for receiving, from a first network node, a first request to perform a data operation involving first data associated with an identified UE and an identified NF. In the embodiment illustrated in FIG. 11, the UDSF 12 includes a sending module 32 for sending, to the first network node, a response to the first request, the response comprising a locking status of the first data and/or redirect information.

Figure 12:
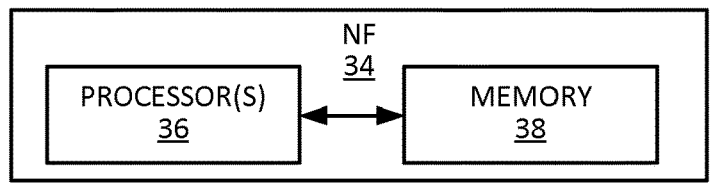
FIG. 12 illustrates a block diagram of an exemplary Network Function (NF) node according to an embodiment of the present disclosure.

FIG. 12 is a schematic block diagram of a NF 34 (which may be the NF1 16, the NF2 18, the SMF1 20, the SMF2 22, or any other type of NF) according to some embodiments of the present disclosure. As illustrated, the NF 34 includes one or more processors 36 (e.g., CPUs, ASICs, FPGAs, DSPs, and/or the like) and memory 38. In some embodiments, the functionality of the NF 34 described above may be implemented in hardware (e.g., via hardware within the processor(s) 36) or be implemented in a combination of hardware and software (e.g., fully or partially implemented in software that is, e.g., stored in the memory 38 and executed by the processor(s) 36).

In some embodiments, a computer program including instructions which, when executed by the at least one processor 36, causes the at least one processor 36 to carry out at least some of the functionality of the NF 34 according to any of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as memory).

Figure 13:
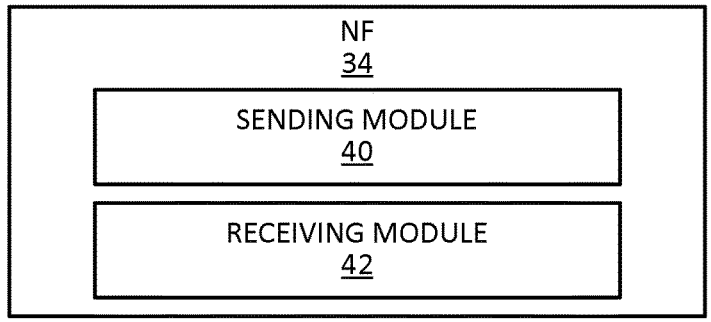
FIG. 13 illustrates a block diagram of an exemplary NF node according to another embodiment of the present disclosure.

FIG. 13 is a schematic block diagram of the NF 34 according to some other embodiments of the present disclosure. The NF 34 includes one or more modules, each of which is implemented in software. In the embodiment illustrated in FIG. 13, the NF 34 includes a sending module 40 for sending, to a UDSF service node for providing UDSF services, a first request to perform a data operation involving first data associated with an identified UE and an identified NF. In the embodiment illustrated in FIG. 13, the NF 34 includes a receiving module 42 for receiving, from the UDSF service node, a response to the first request, the response comprising a locking status of the first data and/or redirect information.

In the examples above, an SMF receives a request from another NF to provide SMF services for a particular UE and in response sends a UDSF services request to a UDSF node to retrieve the SMF context for that UE, but the subject matter of the present disclosure is not limited to just this scenario. Any type of NF may query a UDSF node to retrieve context for that particular NF type. Likewise, any type of NF may query a UDSF node to retrieve any type of unstructured (and/or structured) data, not just context data.

In one embodiment, the NRF 24 may be configured such that when a NF performs Service Discovery for the UDSF service, the NRF 24 may return a UDSF address for the part of the UE ID, such as the Public Land Mobile Network (PLMN) part and/or the PDU Session ID in question. The UDSF address returned by the NRF 24 may be the address of a particular UDSF node or it may be the address of a UDSF front end, e.g., a node that can proxy or relay to one UDSF out of many, i.e., to the UDSF that holds the session context for the UE ID or PDU session ID in question. In one embodiment, it is assumed that at least one UDSF is deployed per PLMN, and may be deployed with finer granularity, e.g., one UDSF per Tracking Area.

In one embodiment, UDSFs may be locally configured to handle specific types of NFs. For example, in one embodiment, all SMFs in a PLMN may be configured to contact one UDSF, all AMFs in the PLMN may be configured to contact another UDSF, and so on.

Cloud Native Architecture

One motivation to introduce the UDSF is to enable full stateless Fifth Generation (5G) Core Network (5GC) functions, such as the SMF, for example, to facilitate NF implementation in a Cloud Native Architecture (CNA), which enables dynamic instantiation of NF instance based on incoming load. This makes scale-up and scale-down easier. In addition, it makes the network more robust in case of any NF failure, e.g., a replacement NF may be implemented very quickly. Creating a shared data storage function is one step further for such stateless operations, i.e. each individual 5GC NF is kept as stateless, required UE context is stored in a shared Data storage, and to be fetched when some services are invoked for the given UE.

For example, if the SMF1 20 were to go out of service, e.g., due to hardware failure or scheduled system maintenance, another hardware node could be quickly configured to handle SMF functions. Since the context information is stored on the UDSF 12 rather than on the SMF1 20, the replacement SMF node can resume SMF operations immediately. Likewise, if the need for a particular NF increases, an additional node may be configured to provide the particular NF type needed. The same principle applies not only to entire nodes but to portions of nodes, i.e., that a node with surplus capacity (processing power, storage, etc.) may be reconfigured to use that surplus capacity to provide the particular NF type or types needed by the network.

The following acronyms are used throughout this disclosure.

3GPP Third Generation Partnership Project
5G Fifth Generation
5GC 5G Core Network
AMF Access and Mobility Management Function
ASIC Application Specific Integrated Circuit
CNA Cloud Network Architecture CP Control Plane
CPU Central Processing Unit
CRUD Create, Read, Update, Delete
DB Database
DSP Digital Signal Processor
FPGA Field-Programmable Gate Array
ID Identity/Identifier
IP Internet Protocol
JSON JavaScript Object Notation
NF Network Function
NRF Network Repository Function
NSSA Network Slice Selection Assistance
PDU Protocol Data Unit
PLMN Public Land Mobile Network
QoS Quality Of Service
SBA Service Based Architecture
SDSF Structured Data Storage Function
SMF Session Management Function
SUPI Subscriber Permanent Identifier
TS Technical Specification
UDSF Unstructured Data Storage Function
UE User Equipment
URL Uniform Resource Locator
XML Extensible Markup Language Those skilled in the art will recognize improvements and modifications to the embodiments of the present disclosure. All such improvements and modifications are considered within the scope of the concepts disclosed herein and the claims that follow.

What is claimed is:

1. A method for Unstructured Data Storage Function, UDSF, services in a telecommunications network, the method comprising:
at a UDSF node for providing UDSF services and having circuitry:
receiving, from a first network node, a first request to perform a data operation involving first data associated with an identified User Equipment, UE, and an identified Network Function, NF, the data operation being related to one of the UDSF services provided by the UDSF node;
sending, to the first network node, a response to the first request, the response comprising a locking status of the first data, the locking status indicating that the first data is not locked;
receiving, from the first network node, a request to lock the first data and redirect information that identifies an address of the first network node that requests the locking the first data;
locking the first data and storing the redirect information; and
sending a message, to the first network node, notifying that the first data is locked and the redirect information is saved in the UDSF node.

2. The method of claim 1 further comprising performing the data operation on the first data according to the first request.

3. The method of claim 1 wherein the response to the first request comprises at least some of the first data.

4. The method of claim 1 wherein the response to the first request comprises a locking status that indicates that the first data is locked or not locked.

5. The method of claim 1 wherein the response to the first request comprises redirect information that identifies a network node for which the data has been locked.

6. A network node for providing an Unstructured Data Storage Function, UDSF, in a telecommunications network, the network node comprising:
one or more processors; and
memory storing instructions executable by the one or more processors, whereby the network node is operable to:
receive, from a first network node, a first request to perform a data operation involving first data associated with an identified User Equipment, UE, and an identified Network Function, NF, the data operation being related to one of UDSF services provided by the network node;
send, to the first network node, a response to the first request, the response comprising a locking status of the first data, the locking status indicating that the first data is not locked;
receiving, from the first network node, a request to lock the first data and redirect information that identifies an address of the first network node that requests the locking the first data;
locking the first data and storing the redirect information; and
sending a message, to the first network node, notifying that the first data is locked and the redirect information is saved in the network node.

7. The network node of claim 6 wherein, via execution of the instructions by the one or more processors, the network node is further operable to perform the data operation on the first data according to the first request.

8. The network node of claim 7 wherein the response to the first request comprises redirect information that identifies a network node for which the data has been locked.

9. The network node of claim 6 wherein the response to the first request comprises at least some of the first data.

10. The network node of claim 6 wherein the response to the first request comprises a locking status that indicates that the first data is locked or not locked.

11. A method for Unstructured Data Storage Function, UDSF, services in a telecommunications network, the method comprising:
at a Network Function, NF, node having circuitry:
sending, to a UDSF service node for providing UDSF services, a first request to perform a data operation involving first data associated with an identified User Equipment, UE, and an identified NF, the data operation being related to one of the UDSF services provided by the UDSF service node;
receiving, from the UDSF service node, a response to the first request, the response comprising a locking status of the first data, the locking status indicating that the first data is not locked;
sending, to the UDSF service node, a request to lock the first data and redirect information that identifies an address of the NF node that requests the locking the first data; and
receiving a message, from the UDSF service node, notifying that the first data is locked and the redirect information is saved in the UDSF service node.

12. The method of claim 11 wherein the response to the first request comprises at least some of the first data.

13. The method of claim 11 wherein the response to the first request comprises a locking status that indicates that the first data is locked or not locked.

14. The method of claim 11 wherein the response to the first request comprises redirect information that identifies a network node for which the data has been locked.

15. The method of claim 14 further comprising forwarding the first request to the network node for which the data has been locked or sending the redirect information to another NF node.

16. A network node for providing a Network Function, NF, in a telecommunications network, the network node comprising:
one or more processors; and
memory storing instructions executable by the one or more processors, whereby the network node is operable to:
send, to a UDSF service node for providing UDSF services, a first request to perform a data operation involving first data associated with an identified User Equipment, UE, and an identified NF, the data operation being related to one of the UDSF services provided by the UDSF service node;
receive, from the UDSF service node, a response to the first request, the response comprising a locking status of the first data, the locking status indicating that the first data is not locked;
send, to the UDSF service node, a request to lock the first data and redirect information that identifies an address of the network node that requests the locking the first data; and
receive, a message, from the UDSF service node, notifying that the first data is locked and the redirect information is saved in the UDSF service node.

17. The network node of claim 16 wherein the response to the first request comprises at least some of the first data.

18. The network node of claim 16 wherein the response to the first request comprises a locking status that indicates that the first data is locked or not locked.

19. The network node of claim 16 wherein the response to the first request comprises redirect information that identifies a network node for which the data has been locked.

20. The method of claim 19 wherein, via execution of the instructions by the one or more processors, the network node is further operable to forward the first request to the network node for which the data has been locked or to send the redirect information to another NF node.

* * * * *